United States Patent [19]

Gray

[11] Patent Number: 4,600,331
[45] Date of Patent: Jul. 15, 1986

[54] SWIVEL COUPLING

[75] Inventor: Charles E. Gray, Ledyard, Conn.

[73] Assignee: Harvey Hubbell Incorporated, Orange, Conn.

[21] Appl. No.: 746,302

[22] Filed: Jun. 19, 1985

[51] Int. Cl.[4] .............................................. F16D 1/12
[52] U.S. Cl. ........................................ 403/165; 59/95
[58] Field of Search ................... 403/165, 164, 78; 59/95, 9

[56] References Cited

U.S. PATENT DOCUMENTS

| | | | |
|---|---|---|---|
| 1,994,674 | 3/1935 | Van Inwagen, Jr. | 24/123 |
| 2,112,281 | 3/1938 | Ferris | 24/123 |
| 2,387,599 | 10/1945 | Miller et al. | 287/91 |
| 2,651,533 | 9/1953 | Miller | 287/91 |
| 2,740,000 | 3/1956 | Wierk | 403/165 X |
| 2,811,378 | 10/1957 | Kalista | 403/78 X |
| 3,030,136 | 4/1962 | Rowlett | 403/165 |
| 3,346,284 | 10/1967 | Petersen et al. | 403/78 |
| 4,368,910 | 1/1983 | Fidrych | 294/86 |
| 4,453,291 | 6/1984 | Fidrych | 24/115 |
| 4,514,005 | 4/1985 | Fallon | 294/86.42 |

FOREIGN PATENT DOCUMENTS 1015542  1/1966  United Kingdom ............... 403/164

Primary Examiner—Andrew V. Kundrat
Attorney, Agent, or Firm—Jerry M. Presson; Walter C. Farley

[57] ABSTRACT

A small, strong swivel coupling includes a spindle connectable to a pulling device, the spindle having a reduced diameter, axially extending central core which is threaded to receive a thrust nut and a lock nut. At the other end of the coupling, an end cap is connected to an axially extending sleeve which has an inwardly protruding flange. The flange and thrust nut form oppositely facing surfaces which are separated from each other by a low-friction washer preferably made of polytetrafluoroethylene. The coupling can withstand large axial forces and still rotate to relieve torques which might damage a cable being pulled.

7 Claims, 4 Drawing Figures

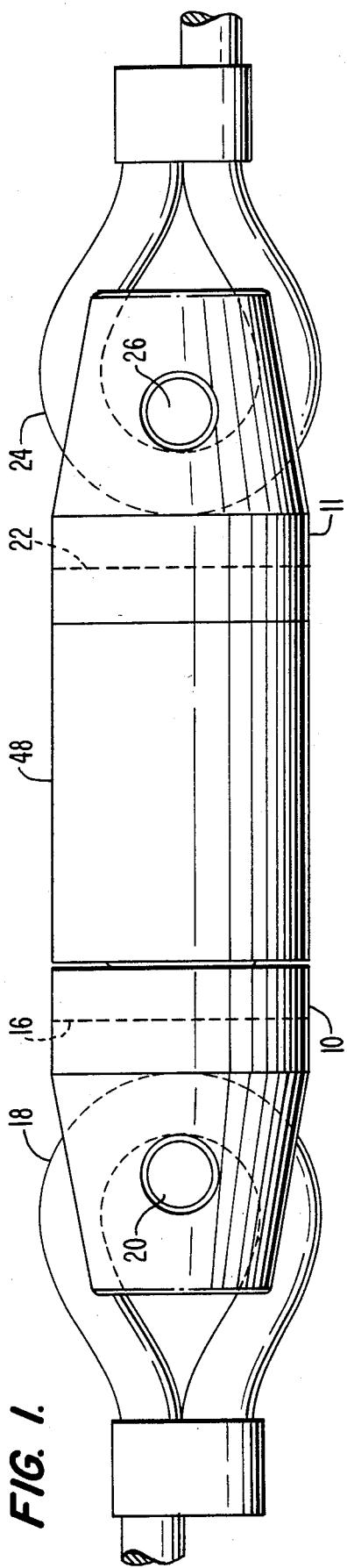
FIG. 1.
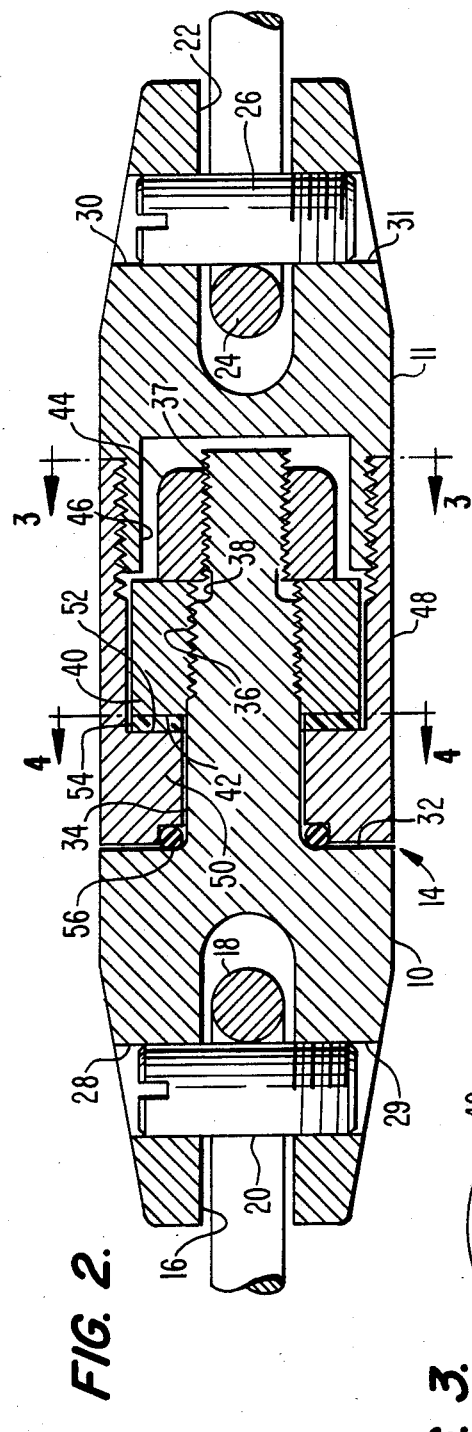
FIG. 2.
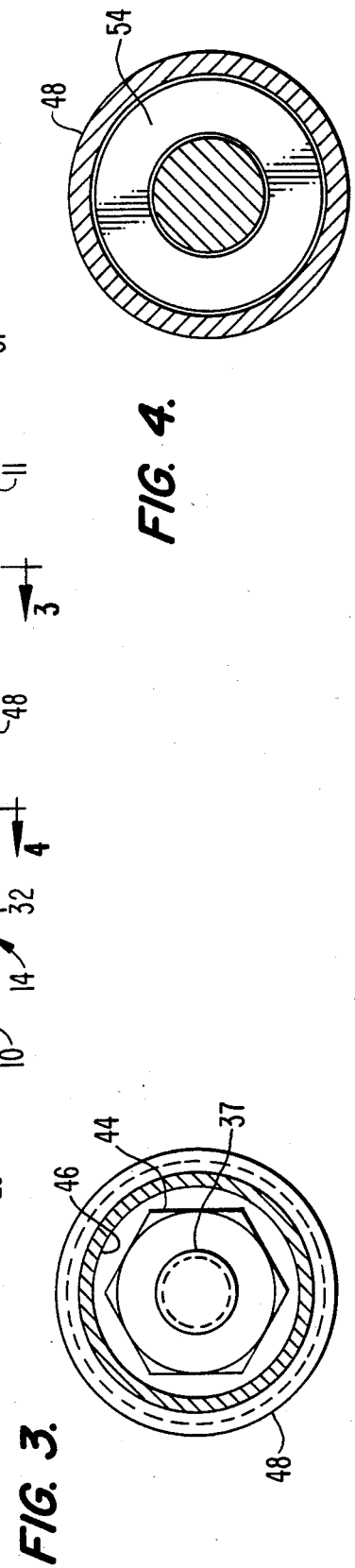
FIG. 4.
FIG. 3.

SWIVEL COUPLING

This invention relates to an improved swivel coupling for use in pulling cables, particularly fiber optic cables.

BACKGROUND OF THE INVENTION

When a cable is to be placed inside of a conduit or other passage, particularly when the conduit or passage is already installed in a building or other structure, it is common to use a pulling wire which is smaller than the cable to be installed and which can be metallic or nonmetallic. Commonly, the cable includes a number of electrical conductors or, more recently, optical fibers and has a significant diameter relative to the size of the passage. The smaller pulling wire is first inserted and then is coupled to an end of the cable so that the cable can be pulled through the passage.

The apparatus for coupling the wire to the cable can take various forms, depending on the nature of the cable. One device which is quite useful is a mesh sleeve which radially contracts when it is subjected to longitudinal tension. This sleeve is placed over the end of the cable in a radially expanded state and is then elongated so that it contracts around the cable, gripping the cable more firmly as axial tension increases.

Sleeves of this type, as well as other kinds of gripping devices, are often provided with a coupling device at the end which is connected to the end of the sleeve either detachably or permanently, and which is connectable to the pulling wire. This coupling is intended to perform two basic functions, one being to transfer the longitudinal tension forces from the pulling wire to the sleeve and cable. The other function is to prevent harmful twisting torques from building up in the wire and cable. In order to perform this latter function, the coupling device is often made so that one part is rotatable relative to the other and is then referred as a swivel coupling.

Swivel couplings for various purposes are shown in the following patents:

U.S. Pat. No. 2,387,599 Miller et al,
U.S. Pat. No. 2,651,533 Miller

It has been found, however, that the requirements for pulling fiber optic cables are such that conventional swivel couplings are not suitable, partly because they are generally somewhat too large, or because they do not have sufficient rotational freedom. If made smaller with bearings such as those in the above patents, such devices are very expensive and are not capable of withstanding some of the forces imposed, but if the bearings are eliminated the torques which develop are greater than can be safely imposed on the cable and other related hardware.

SUMMARY OF THE INVENTION

Accordingly, an object of the present invention is to provide a swivel coupling, particularly for use with fiber optic cables, which is relatively simple to produce but is strong and is capable of relieving torque while subjected to axial stress.

A further object is to provide such a swivel which can be made sufficiently small so that it can traverse the passages through which small-diameter fiber optic cables are to be passed.

Briefly described, the invention includes a swivel coupling comprising the combination of a spindle having a central, axially extending, externally threaded cylindrical core with means on the spindle for connection to a first axial force transmission device. An end cap is also provided with means for connection to a second axial force transmission device. A cylindrical tubular sleeve is attached to the end cap and surrounds the core, the sleeve having a radially inwardly protruding flange near the distal end thereof, the flange having a shoulder facing axially toward the end cap. An internally threaded thrust nut surrounds the core within the sleeve and threadedly engages the external threads on the core, the thrust nut having an axially facing end surface opposite to and facing the shoulder. A washer of low-friction polymeric material between the shoulder and the end surface permits the spindle and the end cap to be relatively rotatable when oppositely directed axially forces are applied to the first and second axial force transmission devices.

In order to impart full understanding of the manner in which these and other objects are attained in accordance with the invention, particularly advantageous embodiments thereof will be described with reference to the accompanying drawings, which form a part of this specification and wherein;

FIG. 1 is a side elevation of a swivel coupling in accordance with the invention;

FIG. 2 is a side elevation in longitudinal section of the swivel coupling of FIG. 1;

FIG. 3 is a transverse sectional view along line 3—3 of FIG. 2; and

FIG. 4 is a transverse sectional view along line 4—4 of FIG. 2.

DESCRIPTION OF THE PREFERRED EMBODIMENT

As seen in FIG. 1, the swivel coupling in accordance with the invention includes a spindle 10 and an end cap 11 which are separated by a relatively narrow gap indicated at 14 and which are rotatable relative to each other. One end of the spindle is bifurcated by an inwardly extending recess 16 dimensioned and shaped to receive a conventional eye 18 which is retained in the recess by a removable pin 20.

At the other end, end cap 11 is similarly provided with a recess 22 to receive an eye 24 which is retained by a pin 26.

As also seen in FIG. 2, the portions of spindle 10 on opposite sides of recess 16 are provided, respectively, with a smooth opening 28 and an internally threaded opening 29, both of these openings extending through the respective portions. Pin 20 is dimensioned to pass entirely through opening 28 and is externally threaded at one end to be threadedly received in opening 29.

Similarly, pin 26 is externally threaded at one end and is dimensioned to pass through an internally smooth opening 30 in the end cap and to threadedly engage an internally threaded opening 31 in the other side of the end cap.

Spindle 10 is provided with a reduced diameter portion forming a face 32 which faces toward the end cap, the reduced diameter portion comprising central cylindrical core 34. Core 34 has a smooth portion followed by an externally threaded portion 36 and a smaller diameter portion 37, portions 36 and 37 being separated by an undercut annular groove 38. An internally threaded thrust nut 40 is dimensioned to be threadedly received on portion 36, the relative lengths of the threaded and smooth portions being selected so that nut 40 can be fully threaded onto portion 36 to the limit of that threaded portion. Nut 40 is provided with a flat end face 42 which faces toward and is substantially parallel with surface 32 on the spindle. A lock nut 44, which is preferably hexagonal, is dimensioned to be threadedly received on portion 37 until it abuts the rear face of thrust nut 40.

A cylindrical externally threaded sleeve or skirt 46 extends axially from end cap 11 toward spindle 10, the length of sleeve portion 46 being only slightly greater than the length of threaded portion 37 on core 34. A separate cylindrical sleeve member 48 is internally threaded at one end to threadedly engage portion 46. At the other end of sleeve 48 is a radially inwardly extending flange 50 the radial thickness of which is slightly less than the reduction in diameter of spindle 10 from the outer surface thereof to the smooth portion of core 34. A shoulder 52 of flange 50 faces toward end surface 42 of thrust nut 40 and is separated therefrom by a flat annular washer 54. At the other side of flange 50 is a small rectangular recess at the inner corner which receives an O-ring 56 which is preferably made of a high-temperature rubber or similar elastomeric material.

Washer 54 is of particular significance to this structure because it forms the primary contact between the relatively rotatable ends and provides low-friction coupling between them. Washer 54 is made of a low-friction polymeric material such as polytetrafluoroethylene, commonly referred to as TFE and sold by DuPont Corporation under the trademark TEFLON. The washer can be made using conventional molding-sintering techniques.

End cap 11 with its sleeve portion 46 and sleeve 48 attached thereto act as a single, integral body connected to an axial force transmission device such as ring 24. On the other side, spindle 10 with thrust nut 40 and lock nut 44 attached thereto act as an integral body coupled to another axial force transmission device such as ring 18. When oppositely directed axial forces are imposed upon rings 18 and 24, washer 54 is subjected to compressive force between surfaces 42 and 52 on the thrust nut and flange, respectively. However, because of the low friction characteristics of the polytetrafluroethylene washer 54, if either one of the rings 18, 24 is caused to be rotated so as to exert a torque on its associated body, tending to rotate that body about the axis of the swivel coupling, the washer permits such rotation freely, thereby relieving torques which would otherwise be transmitted to a cable connected to the other one of the rings.

As previously suggested, one of the rings is connected to a pulling wire while the other is connected to a device engaging the cable to be threaded through a passage. Assuming that ring 24 is connected to the pulling wire, ring 18 can be connected to the pulling end of a cable grip such as that shown in U.S. Pat. No. 4,293,157, Fidrych or U.S. Pat. No. 4,354,705, Shorey et al or any one of a number of other cable grip devices.

The swivel coupling described herein can easily be manufactured to have an outer diameter of ⅝ inches and a length of about 2.5 inches, these dimensions being such that the swivel coupling can easily pass through passages intended for fiber optic cables as well as cables of various other types. All of the components shown and described, with the exception of O-ring 56 and washer 54, are preferably made of steel so that the coupling is extremely strong despite its small size.

While one advantageous embodiment has been chosen to illustrate the invention, it will be understood by those skilled in the art that various changes and modifications can be made therein without departing from the scope of the invention as defined in the appended claims.

What I claim is:

1. A swivel coupling comprising the combination of
   a spindle having a central, axially extending, externally threaded cylindrical core;
   means on said spindle for connection to a first axial force transmission device;
   an end cap;
   means on said end cap for connection to a second axial force transmission device;
   a cylindrical tubular sleeve attached to said end cap and surrounding said core,
     said sleeve having a radially inwardly protruding flange near the distal end thereof;
     said flange having means defining a shoulder facing axially toward said end cap;
   an internally threaded thrust nut surrounding said core within said sleeve and threadedly engaging the external threads on said core,
   said thrust nut having an axially facing end surface opposite to and facing said shoulder;
   a washer of low-friction polymeric material between said shoulder and said end surface to permit said spindle and said end cap to be relatively rotatable when oppositely directed axial forces are applied to said first and second axial force transmission devices; and
   a lock nut on said core to lock said thrust nut in position,
   and wherein said core has a smaller diameter threaded end portion to threadedly receive said lock, nut and a larger diameter adjacent threaded portion to threadedly receive said thrust nut.

2. A coupling according to claim 1 and further comprising a sealing ring between said flange and said core.

3. A coupling according to claim 1 wherein said sleeve includes
   a first, threaded portion unitarily formed on said end cap, and
   a second, tubular portion having threads at one end to engage the threads on said first portion and having said flange at the other end.

4. A coupling according to claim 3 wherein said means on said spindle for connection to a force transmission device includes
   an axially inwardly extending recess, and
   a first yoke pin removably attached to said spindle and extending across said recess.

5. A coupling according to claim 4 wherein said means on said end cap for connection to a force transmission device includes
   an axially inwardly extending recess, and
   a second yoke pin removably attached to said end cap and extending across said recess.

6. A coupling according to claim 1 wherein the adjacent portions of the outer surfaces of said spindle, said end cap and said sleeve have substantially equal diameters to present a smooth, substantially uninterrupted outer coupling surface.

7. A coupling according to claim 1 and further comprising an annular recess separating said larger and smaller diameter threaded portions on said core.

* * * * *